United States Patent

Bodin et al.

Patent Number: 6,135,247
Date of Patent: Oct. 24, 2000

[54] WHEEL HUB AND BRAKE DISC ARRANGEMENT FOR HEAVY VEHICLES

[75] Inventors: Jan-Olof Bodin, Alingsås; Ingemar Dagh, Hisings Backa, both of Sweden

[73] Assignee: AB Volvo, Gothenburg, Sweden

[21] Appl. No.: 09/011,716

[22] PCT Filed: Aug. 13, 1996

[86] PCT No.: PCT/SE96/01009

§ 371 Date: Mar. 6, 1998

§ 102(e) Date: Mar. 6, 1998

[87] PCT Pub. No.: WO97/06965

PCT Pub. Date: Feb. 27, 1997

[30] Foreign Application Priority Data

Aug. 16, 1995 [SE] Sweden .................. 9502854

[51] Int. Cl.⁷ .................. F16D 65/10; B60T 1/06
[52] U.S. Cl. .................. 188/218 XL; 188/18 A; 192/107 R
[58] Field of Search .................. 188/218 XL, 18 A, 188/73.2, 73.31, 264 AA; 192/113.34, 70.12, 70.13, 107 R; 228/182

[56] References Cited

U.S. PATENT DOCUMENTS

| | | | |
|---|---|---|---|
| 3,621,945 | 11/1971 | Spry | 188/71.5 |
| 4,043,437 | 8/1977 | Taylor | 192/13 R |
| 4,256,209 | 3/1981 | Lupertz | 188/218 XL |
| 4,280,609 | 7/1981 | Cruise | 192/113 B |
| 4,356,901 | 11/1982 | Koehler et al. | 192/70.2 |
| 4,672,007 | 6/1987 | Teng et al. | 428/624 |
| 4,967,890 | 11/1990 | Landa et al. | 192/70.2 |
| 4,967,893 | 11/1990 | Vogele | 192/107 R |
| 5,137,123 | 8/1992 | Setogawa et al. | 188/264 AA |
| 5,358,086 | 10/1994 | Muller et al. | 192/107 A |
| 5,551,549 | 9/1996 | Cooke et al. | 192/107 R |
| 5,568,846 | 10/1996 | Dagh et al. | 188/218 XL |
| 5,626,211 | 5/1997 | Gewelber et al. | 188/218 |
| 5,713,450 | 2/1998 | Quigley | 192/107 A |

FOREIGN PATENT DOCUMENTS

WO 93/14947  8/1993  WIPO .
WO 95/15445  6/1995  WIPO .

*Primary Examiner*—Robert J. Oberleitner
*Assistant Examiner*—Bradley King
*Attorney, Agent, or Firm*—Young & Thompson

[57] ABSTRACT

A wheel hub and brake disc arrangement for a vehicle wheel includes a wheel hub with alternately following grooves and teeth with inclined flanks, and a brake disc, carried on the part of the wheel hub, having a concentric opening which is formed with corresponding teeth and grooves which are adapted to the grooves and teeth of the hub, the brake disc being locked against rotation on the hub and having a slip fit between the disc and the hub. In order to reduce the heat transfer between hub and disc and minimize the stresses in the disc caused by the temperature distribution and the mechanical effects, the tip arc length for each tooth is less than the root arc length for each groove which is delimited by two opposing flanks of adjacent teeth, the flanks each merge at the respective root side of the teeth into a first radius Ra, which in turn emerges into a second radius Rb which forms the bottom of the groove and is common for the two opposing flanks.

6 Claims, 4 Drawing Sheets

WHEEL HUB AND BRAKE DISC ARRANGEMENT FOR HEAVY VEHICLES

BACKGROUND OF THE INVENTION

The present invention concerns a wheel hub and brake disc arrangement for a vehicle wheel comprising a wheel hub rotatably mounted on a part of an shaft, which has a part with an external cross section profile formed with alternating teeth and grooves with inclined flanks, and a brake disc, carried by the wheel hub on said part, which has a concentric opening which is formed with corresponding teeth and grooves which are so adapted to the teeth and grooves of the hub that the brake disc is locked against rotation on the hub and there is a slip fitting existing between the disc and the hub.

DESCRIPTION OF THE RELATED ART

Brake discs for disc brakes for heavy vehicles have earlier been fixed on the hubs in the main by being screwed tight onto a circular flange on the hub. This arrangement causes problems because a rigid connection between the disc and the hub at the very high maximum braking moments, which can reach the order of 2000 kpm in the heaviest class of load-carrying vehicles, can cause deformations of the disc because of the powerful heating which is the consequence of the high brake forces which are the case here.

A preferred alternative instead of the rigid connection between the disc and the hub is therefore, as stated in the introduction, to join the disc with the hub through the use of interlocking shapes. With is construction the possibility of avoiding deformation as a consequence of the heating up due to braking is improved at the same time as it is possible to control the heat transfer between the brake disc and the hub dependent on the shape of the hub and the actual construction of the teeth and grooves which are adapted to each other.

A wheel and brake disc arrangement of the last mentioned type which greatly reduces the above stated negative effects has earlier been suggested for use in the heaviest class of load-carrying vehicles. Thus, SE 9200202-1 (469 655), from the same inventor, shows and describes an arrangement of type given in the preamble in which the number of grooves and teeth can be as many as thirty. Stress relief holes with radially inwardly directed slits ensure an esualisation of the tangential stress in the disc which is cooled by means of ventilation openings formed in it. A circular channel is formed in the hub radially inwardly of the teeth in order to lengthen the heat transfer path through the hub material.

With this known arrangement not only is the advantage achieved that during heating the disc can expand radially without twisting or warping but also the considerable advantage that the radial bursting forces on the disc as well as the torsional and bending strains on the profiles can be held to an acceptable level at the same time as the risk of being wedged fast is eliminated even at the very large brake forces which can occur in the heaviest class of vehicles. At the same time it is possible to limit the heat transfer to the bearings by means of the circular channel and the ventilation channels formed in the brake disc.

Because according to the known arrangement the openings for the stress relief holes the slits and the openings of the ventilation channels, in order to achieve the intended effect, are formed in the brake disc in a part which in the radial direction extends from its central opening and a distance into its friction surface, the friction linings will lie over these openings which means increased lining wear and collecting of brake dust and dirt in the openings which require regular cleaning and in extreme cases can cause a breakdown.

SUMMARY OF THE INVENTION

The object of the present invention is therefore to bring about an arrangement with improved interlocking shape connection between hub and brake disc which is optimal with respect to the bursting forces and torsional resp. bending strains on the cross-sectional profiles, at the same time as the stresses caused by the temperature distribution in the disc can be brought down to an acceptable level and heat transfer to the hub can be limited in a simpier and more reliable manner than earlier, and in which the arrangement has a lower maintenance requirement than earlier known arrangements. This is achieved according to the invention with a wheel hub and brake disc arrangement of the type mentioned through the tooth tip arc length for each tooth on the brake disc being less than the root arc length for at least every second groove which is between two opposing flanks of the adjacent teeth; by at least one of the flanks of each tooth at the base of the tooth merging into a first radius Ra; and that the first radius in its turn merges into a second radius Rb which is common for the two opposing flanks and forms the base of the groove. Advantageous further developments and improvements of the invention follow from the other claims.

By leaving out the stress relief holes in the hub part of the disc and instead arranging a large concentric opening in the disc which has teeth and grooves with a relationship between the tip arc length for a tooth relative to a groove root arc length which is less than one, and where the tangential stresses caused by the temperature distribution are minimized by means of a large radius Rb which substantially extends between two root sides of two neighbouring teeth and the mechanical stresses produced are minimized by means of the small radius Ra which connects the large radius with the flanks at the respective root side of the teeth, a smaller difference in the heat gradient as well as an improved ability to take up tangential and radial stresses than with stress relief holes and associated slits is achieved.

Because the heat transfer between the disc and the hub is directly proportional to the total surface area of the flanks in contact with each other in the grooves and on the teeth and therefore is dependent on the number of grooves and teeth, it is possible to control the heat transfer to the hub through changing the number of grooves and teeth.

BRIEF DESCRIPTION OF THE DRAWINGS

The invention is described more closely in the following in more detail with reference to the accompanying schematic drawings shown examples of embodiments.

DESCRIPTION OF THE PREFERRED EMBODIMENT

Figure 1:
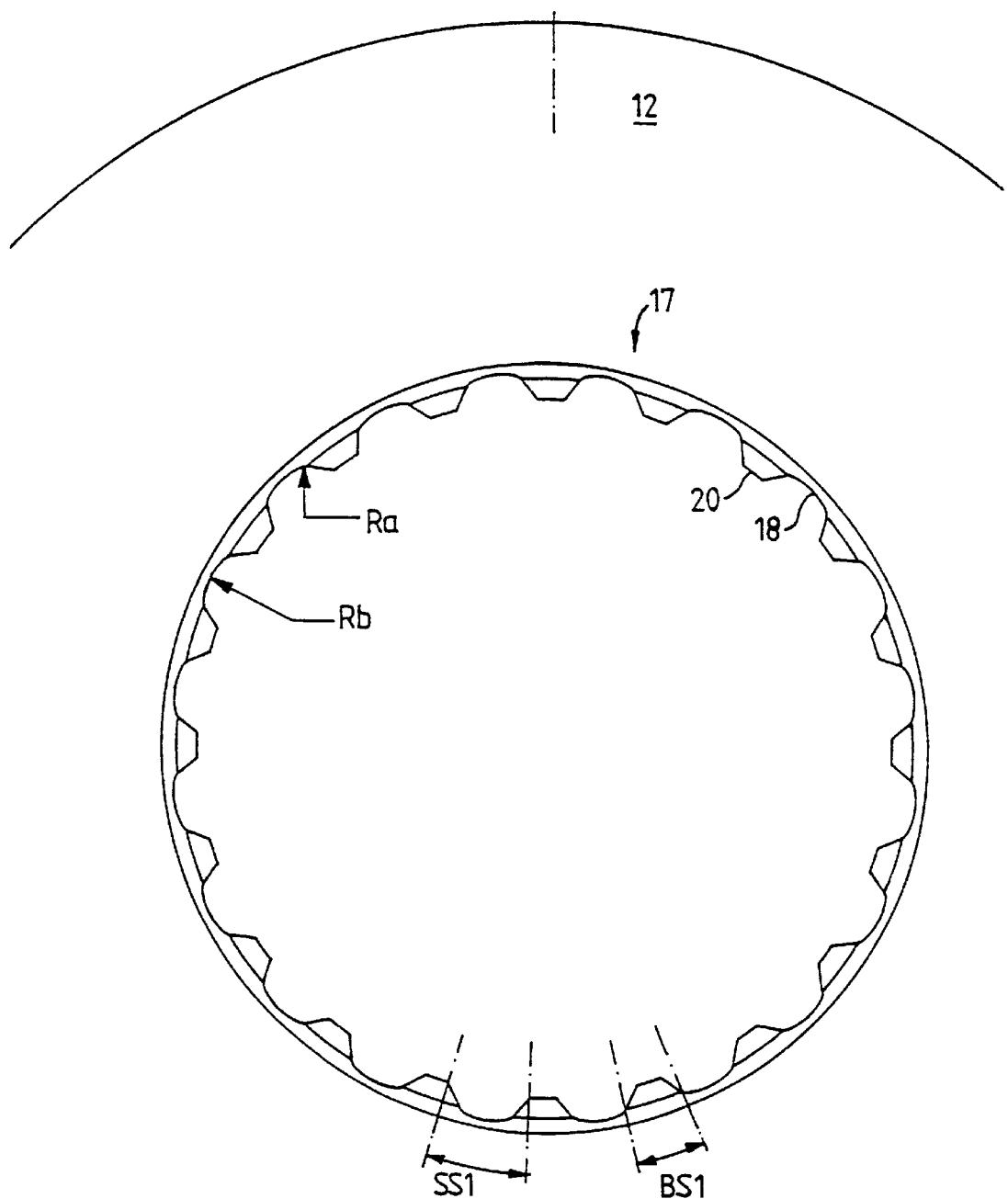
FIG. 1 shows an end view of a radial inner pare of a brake disc.

Reference number 10 refers to a central shaft through a wheel hub 11 which in a conventional manner is supported in bearings on a, for example, not shown front or rear axle of a lorry, which axle has a similarly not shown unit comprising a brake caliper or an activating mechanism. The hub 11 carries a brake disc 12 which in a known manner is fixed to the hub 11 by means of interlocking shapes. For this purpose the hub 11 has a radial outer par which is shaped with alternating teeth 14 and grooves 16 which have inclined flanks. The radial inner hub part 17 of the brake disc 12 is shaped with corresponding grooves 18 and teeth 20, which fit the teeth 14 and grooves 16 of the hub.

Figure 2:
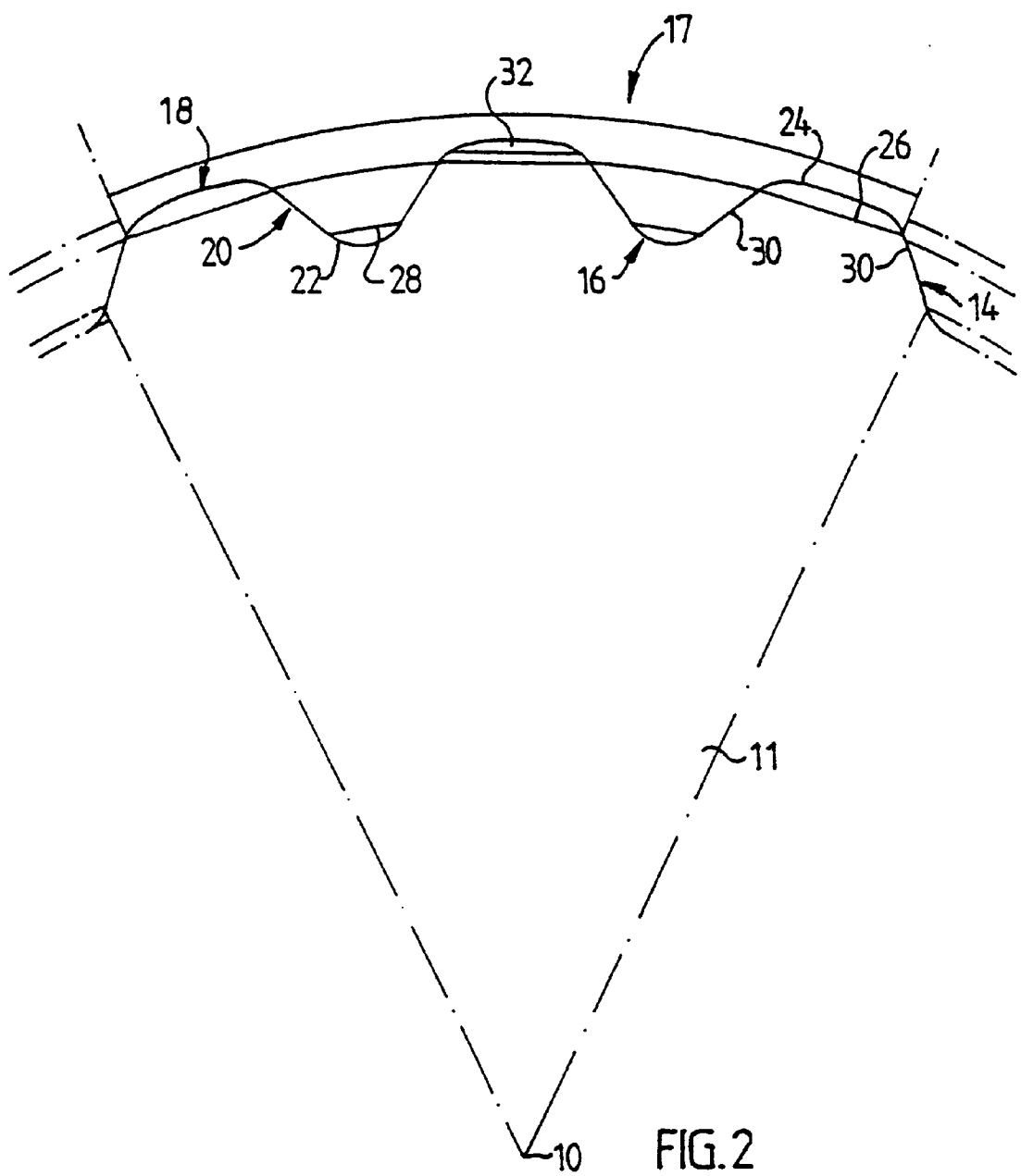
FIG. 2 shows a pare of a hub and disc part according to FIG. 1 in a magnified scale.

As can be seen in FIG. 2, the depth of the grooves 16,18 are somewhat greater than the height of the teeth 14, 20. In both the hub and the brake disc the grooves have a rounded bottom 22 resp. 24, while the teeth have a tip surface 26 resp. 28 formed radially with respect to the central axis 10, which connects to the planar inclined flanks 30 on the respective teeth. Through this arrangement surface contact is ensured in a known way over the whole of the surface area of the flanks of the teeth. The disc 12 and the hub 11 are in this case so dimensioned that in the unloaded condition there is a play of 0.2–0.3 mm existing between the cooperating flank surfaces 30 of the disc and the hub. In the embodiment shown both the hub and the disc each have twenty teeth and grooves.

In the embodiments shown in the drawings, a sacrificial anode 32 of zinc or some other suitable material is placed at the bottom of a groove 18; 36 on the brake disc, in order to prevent disc 12 rusting fast onto the hub 11. If so required, such a sacrificial anode can be placed in several or all of the grooves on the brake disc. In certain applications. as will be described later, it is appropriate to increase the number of grooves and teeth somewhat but the number should not be greater than twentyfour. With variations between these said numbers and depending on the size of the disc, the depth of the grooves has a value in the interval of around 7.5–9% of the radius of the opening 20 in the disc.

In the embodiment shown in FIGS. 1 and 2, the grooves 18 in the brake disc 12 are formed with a root arc length $Ss1$ and the teeth 20 with the tip arc length $Bs1$. The teeth are evenly distributed around the circumference and the relationship $Bs1/Ss1 < 1$. Contrary to the earlier construction the stress relief holes with the related slits have been left out. The tangential stresses during braking, caused by the uneven temperature distribution between the friction part of the brake disc and the radial inner part, are minimized instead through the rounded bottom 24 of each groove 18 which, immediately before they merge into the two opposite flanks 30 of the groove, by merging into its first radius Ra, have a second radius Rb. By means of Ra the mechanical strains, such as torsional and bending strains on the cross-sectional profiles, are minimize Rb>Ra and preferred values for these two radii, in order to optimally reduce both the thermal and the mechanical strains, according to this embodiment are Ra=5 and Rb=24. Depending on the size of the disc, Ra and Rb can be allowed to vary within the interval 3–8 mm resp. 15–30 mm.

Compared with earlier known techniques with thirty teeth and grooves, the heat conduction to the hub has been minimized by a smaller number of teeth and grooves. By varying the number of teeth and grooves, it is possible to optimize the heat transfer from the brake disc 12 to the hub 11, so that the bearings of the wheel are not damaged at the same time as a sufficient cooling is achieved in order to avoid overheating during heating of the disc. Consequently, if the disc does not receive sufficient cooling it is appropriate to increase the twenty grooves and teeth stated in the embodiment to e.g. twenty-two or, on the other hand, if the bearings risk being damage, it is appropriate to go down to a smaller number of grooves and teeth.

Figure 3:
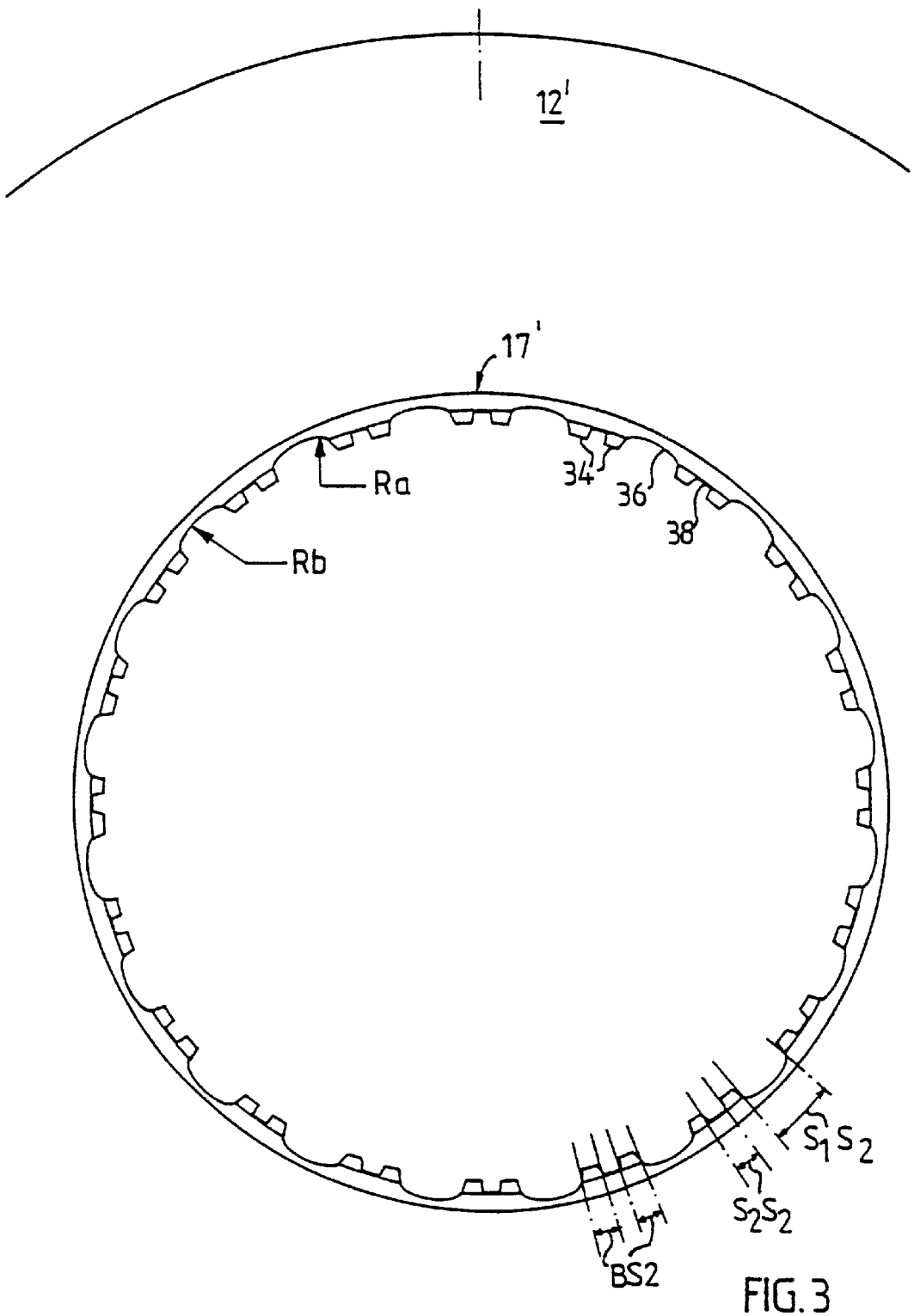
FIG. 3 shows a variation of a radial inner part of the brake disc.
Figure 4:
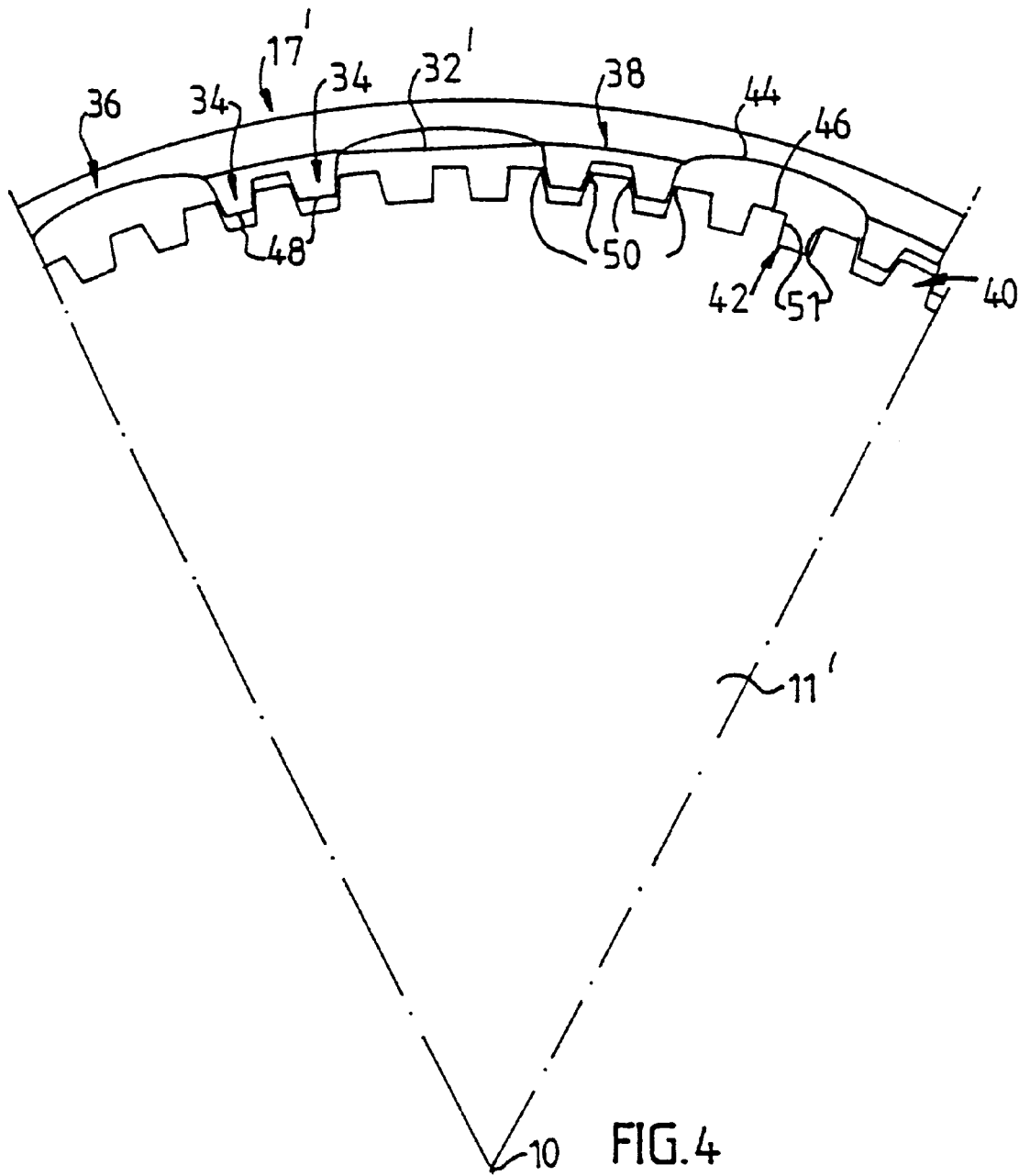
FIG. 4 shows a part of a hub and disc part according to FIG. 3 in a magnified scale.

A second embodiment which is shown in FIGS. 3 and 4 has many similarities with and. in the main the same function as the earlier described embodiment. Therefore, in the following we will only touch on that which is special for just this embodiment. Thus, the radial inner hub part 17' of the brake disc 12 is similarly formed with alternating teeth 34, gap grooves 36 and grooves 38, which hooves 36 and 38 have inclined flanks. However, the teeth 34 ararranged in groups of two and two, and each group is separated from a neighbouring group by the gap groove 36. In each group the teeth are separated by the groove 38. The gap groove 36 is shaped similarly to that which was described earlier with reference to FIGS. 1 and 2, i.e. with planar flanks, and connected to them first radii Ra which each merge into a common second radius Rb.

The hub 11' is also in the second embodiment shaped with alternating teeth 40 and grooves 42 adapted to the brake disc, which have inclined flanks and are so dimensioned that every fourth tooth 40 fits each groove 38. The middle tooth of the three teeth 40 which lie between every fourth tooth is without contact in the middle of each gap groove 36 while the other two are each in contact with one flank of the groove. Each gap groove 36 has a rounded bottom 44 and the teeth of both the hub and the disc have a tip surface 46 resp. 48 radially shaped relative to the central axis 10, which are connected to, in similarity with the earlier embodiment inclined flanks in the shape of plane flanks 50 on the respective teeth. In this way, a corresponding cooperation between the mutually contacting flank surfaces 50 and 51 on the disc resp. the hub, as was earlier described for the flank surfaces 30, is achieved.

In the embodiment shown in FIGS. 3 and 4, the gap grooves 36 in the brake disc 12 are shaped with root arc length $S1 s2$ and the teeth 34 with tip arc length $Bs2$. The teeth are arranged in groups evenly distributed around the circumference in pairs and are mutually separated in each group by the root arc length $S2s2$ and the relationship $Bs2/S1s2 < 1$ while the relationship $Bs2/S2s2 = 1$.

In this later embodiment it is true that the number of teeth and grooves is doubled but only every second teeth 40 on the hub is in contact with the flank surfaces 50 on the corresponding tooth 34 in the disc. Because the heat transfer only takes place in the flank surfaces, the total contact surface is not larger but is the same size as that in the first embodiment.

The thanks or the teeth and grooves can also be shaped as curved flanks 30; 50, 51, for example with an a evolvent shape, and the curved top surfaces of the teeth can be flat even if this has nor been specially described.

As can be seen from the figures, the disc 12 in both embodiments is completely symmetrical and is in a known manner fixed onto the hub 11 through (not shown) grooves, known per se, for use with locking rings and a spring washer.

What is claimed is:

1. Wheel hub and brake disc arrangement for a vehicle wheel, comprising a wheel hub on a shaft part rotatable mounted in bearings around a central shaft, having a part with an external cross-section profile shaped with alternating grooves and teeth with inclined flanks, and a brake disc, carried on the wheel hub on said part, having a concentric opening which is shaped with corresponding teeth and grooves fitting on to the grooves and teeth of the hub so that the brake disc is non-rotatably locked onto the hub and that there is a sliding fit between the disc and the hub, and on the brake disc the tip arc length for each tooth is less than the root arc length for at least every second groove which is delimited by two opposing flanks on the adjacent teeth, wherein at least one of the flanks on each tooth at the root side of the tooth merges into a first radius Ra, and that every first radius in turn merges into a second radius Rb which forms the bottom of the groove and is common for the two opposing flanks, wherein the root arc length for each groove which is delimited by two opposing flanks on the adjacent teeth of said cross-sectional profile on the hub is at least equally large as the tip arc length for each tooth.

2. Wheel hub and brake disc arrangement for a vehicle wheel, comprising a wheel hub on a shaft part rotatably mounted in bearings around a central shaft, having a part with an external cross-section profile shaped with alternating grooves and teeth with inclined flanks, and a brake disc, carried on the wheel hub on said part, having a concentric opening which is shaped with corresponding teeth and grooves fitting on to the grooves and teeth of the hub so that the brake disc is non-rotatably locked onto the hub and that there is a sliding fit between the disc and the hub, and on the brake disc the tip arc length for each tooth is less than the root arc length for at least every second groove which is delimited by two opposing flanks on the adjacent teeth, wherein at least one of the flanks on each tooth at the root side of the tooth merges into a first radius Ra, and that every first radius in turn merges into a second radius Rb which forms the bottom of the groove and is common for the two opposing flanks, wherein an anode made of a material of a lower quality than the material of the brake disc, is applied to the bottom of at least one of the grooves in the brake disc.

3. Device according to claim 2, characterized in that the material of the anode is zinc.

4. A wheel hub and brake disc arrangement for a vehicle wheel, comprising:

a wheel hub on a shaft part rotatably mounted around a central shaft, said wheel hub having a part with an external cross-section profile shaped with alternating grooves and teeth with inclined flanks; and a brake disc carried on said wheel hub on said part, said brake disc having a concentric opening shaped with corresponding teeth and grooves fitting onto the grooves and teeth of said wheel hub so that said brake disc is non-rotatably locked onto said wheel hub and forming a sliding fit between said brake disc and said wheel hub, wherein on said brake disc a tip arc length for each tooth is less than a root arc length for at least every second groove delimited by two opposing flanks on adjacent teeth, at least one of the flanks on each tooth at the root side of the tooth merges into a first radius and that every first radius merges into a second radius forming the bottom of the groove and is common for the two opposing flanks, and the root arc length for each groove delimited by the two opposing flanks on the adjacent teeth of the cross-sectional profile on said wheel hub is at least equally large as the tip arc length for each tooth.

5. A wheel hub and brake disc arrangement for a vehicle wheel, comprising:

a wheel hub on a shaft part rotatably mounted around a central shaft, said wheel hub having a part with an external cross-section profile shaped with alternating grooves and teeth with inclined flanks;

a brake disc carried on said wheel hub on said part, said brake disc having a concentric opening shaped with corresponding teeth and grooves fitting onto the grooves and teeth of said wheel hub so that said brake disc is non-rotatably locked onto said wheel hub and forming a sliding fit between said brake disc and said wheel hub; and an anode made of a material of a lower quality than the material of said brake disc is applied to a bottom of at least one of the grooves in said brake disc, wherein on said brake disc a tip arc length for each tooth is less than a root arc length for at least every second groove delimited by two opposing flanks on adjacent teeth, and at least one of the flanks on each tooth at the root side of the tooth merges into a first radius and that every first radius merges into a second radius forming the bottom of the groove and is common for the two opposing flanks.

6. The wheel hub and brake disc arrangement of claim 5, wherein the anode material is zinc.

* * * * *